(12) United States Patent
Wetzel

(10) Patent No.: US 9,964,096 B2
(45) Date of Patent: May 8, 2018

(54) TRIAXIAL FIBER-REINFORCED COMPOSITE LAMINATE

(71) Applicant: Wetzel Engineering, Inc., Lawrence, KS (US)

(72) Inventor: Kyle K Wetzel, Lawrence, KS (US)

(73) Assignee: WEI7 LLC, Lawrence, KS (US)

( * ) Notice: Subject to any disclaimer, the term of this patent is extended or adjusted under 35 U.S.C. 154(b) by 491 days.

(21) Appl. No.: 13/804,489

(22) Filed: Mar. 14, 2013

(65) Prior Publication Data

US 2014/0193269 A1 Jul. 10, 2014

Related U.S. Application Data

(60) Provisional application No. 61/751,088, filed on Jan. 10, 2013.

(51) Int. Cl.
| | |
|---|---|
| *F03D 1/06* | (2006.01) |
| *B32B 5/12* | (2006.01) |
| *B32B 5/26* | (2006.01) |
| *B32B 7/02* | (2006.01) |

(Continued)

(52) U.S. Cl.
CPC .............. *F03D 1/0675* (2013.01); *B32B 5/12* (2013.01); *B32B 5/26* (2013.01); *B32B 7/005* (2013.01); *B32B 7/02* (2013.01); *B32B 5/145* (2013.01); *B32B 2262/02* (2013.01); *B32B 2262/0269* (2013.01); *B32B 2262/101* (2013.01); *B32B 2262/106* (2013.01); *B32B 2262/108* (2013.01); *B32B 2307/54* (2013.01); *B32B 2307/542* (2013.01); *B32B 2307/72* (2013.01); *B32B 2603/00* (2013.01); *F05B 2280/6013* (2013.01);

(Continued)

(58) Field of Classification Search
CPC ......... F03D 1/065; F03D 1/0675; B32B 5/12; B32B 5/26; B32B 5/28; B32B 2262/106; Y10T 428/24124; Y10T 29/49337; Y02E 10/721; B29L 2031/3088; B29C 70/16; B29C 70/20; B29C 70/202; B29K 2995/0045
USPC .................... 416/230; 428/113, 114
See application file for complete search history.

(56) References Cited

U.S. PATENT DOCUMENTS

| | | | | |
|---|---|---|---|---|
| 3,883,267 | A | * | 5/1975 | Baudier .................. F01D 5/282 416/230 |
| 4,022,542 | A | * | 5/1977 | Barbeau .................. F01D 5/183 416/231 R |

(Continued)

OTHER PUBLICATIONS

Zoltek Commercial Carbon Fiber web page from Nov. 10, 2011, p. 1 of 1.*

(Continued)

*Primary Examiner* — Essama Omgba
*Assistant Examiner* — Stephen Mick
(74) *Attorney, Agent, or Firm* — David M. Breiner; BrownWinick Law Firm

(57) ABSTRACT

Provided is a rotor blade that may include a first layer having a first plurality of non-woven fibers oriented at first angle of about 10 to 30 degrees relative to a long axis of the rotor blade, a second plurality of non-woven fibers oriented at a second angle of about 60 to 75 degrees relative to the first plurality of fibers, and a third plurality of non-woven fibers oriented at a third angle of about −60 to about −75 degrees relative to the second plurality of fibers.

2 Claims, 6 Drawing Sheets

(51) Int. Cl.
  *B32B 7/00* (2006.01)
  *B32B 5/14* (2006.01)
(52) U.S. Cl.
  CPC ....... *F05B 2280/702* (2013.01); *Y02E 10/721* (2013.01); *Y10T 428/24124* (2015.01)

(56) References Cited

U.S. PATENT DOCUMENTS

| | | | | |
|---|---|---|---|---|
| 4,022,547 | A * | 5/1977 | Stanley | F01D 5/282 416/230 |
| 2005/0153098 | A1* | 7/2005 | Bhatnagar | B32B 5/12 428/113 |
| 2006/0068158 | A1* | 3/2006 | Howland | B32B 5/26 428/105 |
| 2006/0135022 | A1* | 6/2006 | Porter | B29C 66/721 442/381 |
| 2007/0025859 | A1* | 2/2007 | Jacobsen | F03D 1/065 416/230 |
| 2009/0072439 | A1* | 3/2009 | Karem | F01D 5/147 264/258 |
| 2009/0176067 | A1* | 7/2009 | Palley | B65D 88/14 428/192 |
| 2010/0233424 | A1* | 9/2010 | Dan-Jumbo | B29C 70/202 428/113 |
| 2010/0296941 | A1* | 11/2010 | Zuteck | F03D 1/0675 416/226 |
| 2011/0103962 | A1* | 5/2011 | Hayden | F03D 1/0675 416/226 |
| 2012/0177872 | A1* | 7/2012 | Tsai | B29C 70/202 428/113 |
| 2013/0344279 | A1* | 12/2013 | Doshi | E04B 1/7662 428/74 |

OTHER PUBLICATIONS

Kirk-Othmer Encylopedia of Chemical Technology, 4th Ed. vol. 7, pp. 1-14 (1993).*
Zoltek Carbon Fiber, web archive, Nov. 10, 2011.*

* cited by examiner

TRIAXIAL FIBER-REINFORCED COMPOSITE LAMINATE

CROSS-REFERENCE TO RELATED APPLICATION

This application claims priority to U.S. Provisional Patent Application No. 61/751,088 filed with the United States Patent and Trademark Office on Jan. 10, 2013, the entire contents of which is herein incorporated by reference.

BACKGROUND

1. Field

Example embodiments relate to a triaxial fiber-reinforced composite laminate. In particular, example embodiments are directed to a wind turbine rotor blade that includes the triaxial fiber-reinforced composite material.

2. Description of the Related Art

Wind turbines are mechanical devices that convert wind energy to electrical power. FIG. 1 is a view of a conventional wind turbine. As shown in FIG. 1, a conventional wind turbine 10 includes a tower 20 that supports a generator 30 and a plurality of blades 40, also referred to as air foils. Wind exerts a force on the blades 40 causing them to spin about an axis of rotation Z. The generator 30 converts the blade's motion to electrical power. Thus, the wind turbine 10 is capable of converting wind energy into electricity.

In the conventional art, excessive winds, for example, wind gusts, may cause excessive stresses in the blades 40, the generator 30, and the tower 20. To relieve these stresses, some conventional wind turbines include actuators that change an orientation of the blades. Other conventional systems use blades that have a twist bend coupled section incorporated therein. These systems allow the blades 40 to twist under relatively high loads to reduce the amount of force the wind may exert on the blades thereby reducing stress.

SUMMARY

Example embodiments relate to a triaxial fiber-reinforced composite laminate. In particular, example embodiments are directed to a wind turbine rotor blade that includes the triaxial fiber-reinforced composite material.

In accordance with example embodiments, a rotor blade may include a first layer having a first plurality of non-woven fibers oriented at first angle, a second layer having a second plurality of non-woven fibers oriented at a second angle, and a third layer having a third plurality of non-woven fibers oriented at a third angle. In example embodiments the first angle may be about 10 to 30 degrees relative to a long axis of the rotor blade, the second angle may be about 60 to 75 degrees relative to the first plurality of fibers, and the third angle may be about −60 to about −75 degrees relative to the first plurality of fibers.

In accordance with example embodiments, a structure may include a first layer having a first plurality of non-woven fibers oriented at first angle, a second layer having a second plurality of non-woven fibers oriented at a second angle, and a third layer having a third plurality of non-woven fibers oriented at a third angle. In example embodiments the first angle may be about 10 to 30 degrees relative to a first axis, the second angle may be about 60 to 75 degrees relative to the first plurality of fibers, and the third angle of may be about −60 to about −75 degrees relative to the first plurality of fibers.

In accordance with example embodiments, a triaxial fiber-reinforced composite laminate may include a first layer having a first plurality of non-woven fibers oriented at first angle, a second layer having a second plurality of non-woven fibers oriented at a second angle, and a third layer having a third plurality of non-woven fibers oriented at a third angle. In example embodiments the first angle may be about 10 to 30 degrees relative to a first axis, the second angle may be about 60 to 75 degrees relative to the first plurality of fibers, and the third angle may be about −60 to about −75 degrees relative to the first plurality of fibers.

In example embodiments, the triaxial fiber-reinforced composite laminate may be part of a stitched hybrid fabric and the first axis may be, but is not limited to, a roll wrap direction.

DETAILED DESCRIPTION

Figure 1:
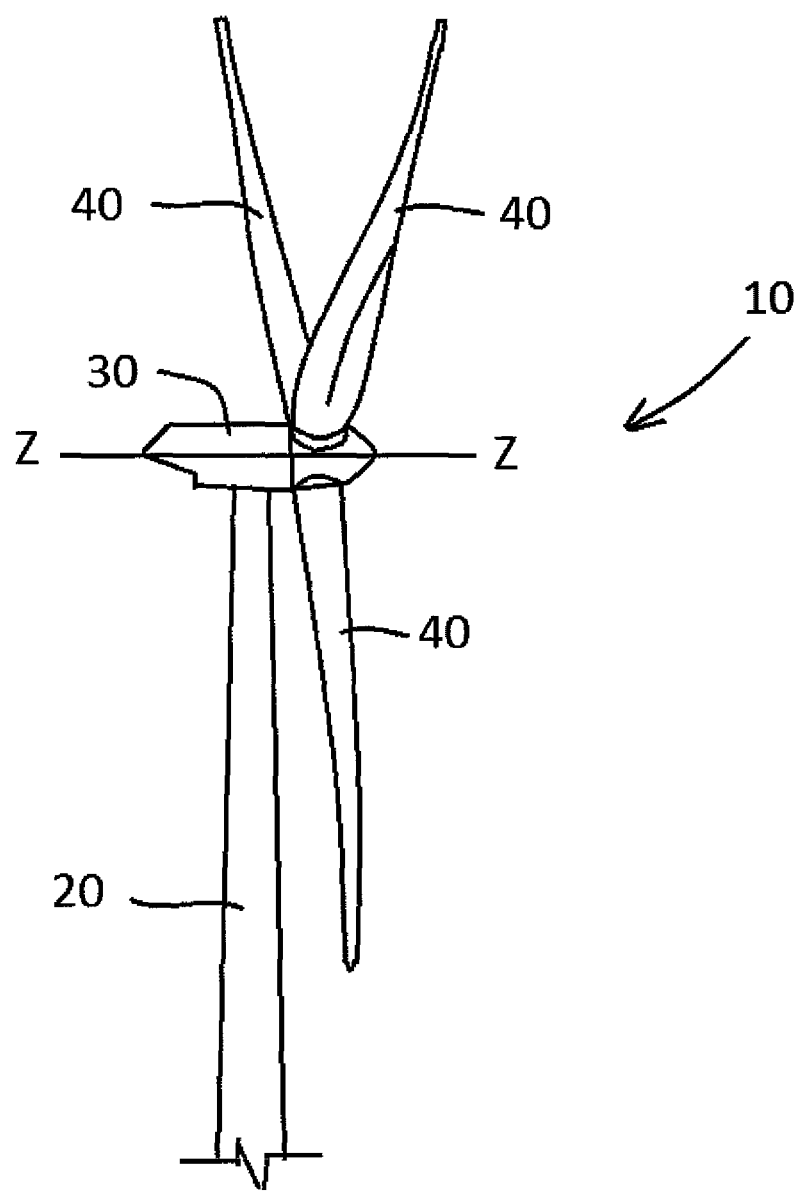
FIG. 1 is a view of a conventional wind turbine.

Example embodiments of the invention will now be described with reference to the accompanying drawings. Example embodiments, however, should not be construed as limiting the invention since the invention may be embodied in different forms. Example embodiments illustrated in the figures are provided so that this disclosure will be thorough and complete. In the drawings, the sizes of components may be exaggerated for clarity.

In this application, when an element is referred to as being "on," "attached to," "connected to," or "coupled to" another element, it can be directly on, attached to, connected to, or coupled to the other element or intervening elements that may be present. On the other hand, when an element is referred to as being "directly on," "directly attached to," "directly connected to," or "directly coupled to" another element, there are no intervening elements present. As used herein, the term "and/or" includes any and all combinations of one or more of the associated listed items.

In this application, the terms first, second, etc. are used to describe various elements, components, regions, layers, and/or sections. However, these elements, components, regions, layers, and/or sections should not be limited by these terms since these terms are only used to distinguish one element, component, region, layer, and/or section from other elements, components, regions, layers, and/or sections that may be present. For example, a first element, component region, layer or section discussed below could be termed a second element, component, region, layer, or section.

In this application, spatial terms, such as "beneath," "below," "lower," "over," "above," and "upper" (and the like) are used for ease of description to describe one element or feature's relationship to another element(s) or feature(s). The invention, however, is not intended to be limited by these spatial terms. For example, if an example of the invention illustrated in the figures is turned over, elements described as "over" or "above" other elements or features would then be oriented "under" or "below" the other elements or features. Thus, the spatial term "over" may encompass both an orientation of above and below. The device may be otherwise oriented (for example, rotated 45 degrees, 90 degrees, 180 degrees, or at other orientations) and the spatially relative descriptors used herein interpreted accordingly.

In this application, example embodiments may be described by referring to plan views and/or cross-sectional views which may be ideal schematic views. However, it is understood the views may be modified depending on manufacturing technologies and/or tolerances. Accordingly, the invention is not limited by the examples illustrated in the views, but may include modifications in configurations formed on the basis of manufacturing process. Therefore, regions illustrated in the figures are schematic and exemplary and do not limit the invention.

The subject matter of example embodiments, as disclosed herein, is described with specificity to meet statutory requirements. However, the description itself is not intended to limit the scope of this patent. Rather, the inventors have contemplated that the claimed subject matter might also be embodied in other ways, to include different features or combinations of features similar to the ones described in this document, in conjunction with other technologies. Generally, example embodiments relate to a tri-axial fiber-reinforced composite laminate. In example embodiments, the tri-axial fiber-reinforced composite laminate may be incorporated into various structures such as, but not limited to, a blade, for example, a wind turbine rotor blade.

Figure 2:
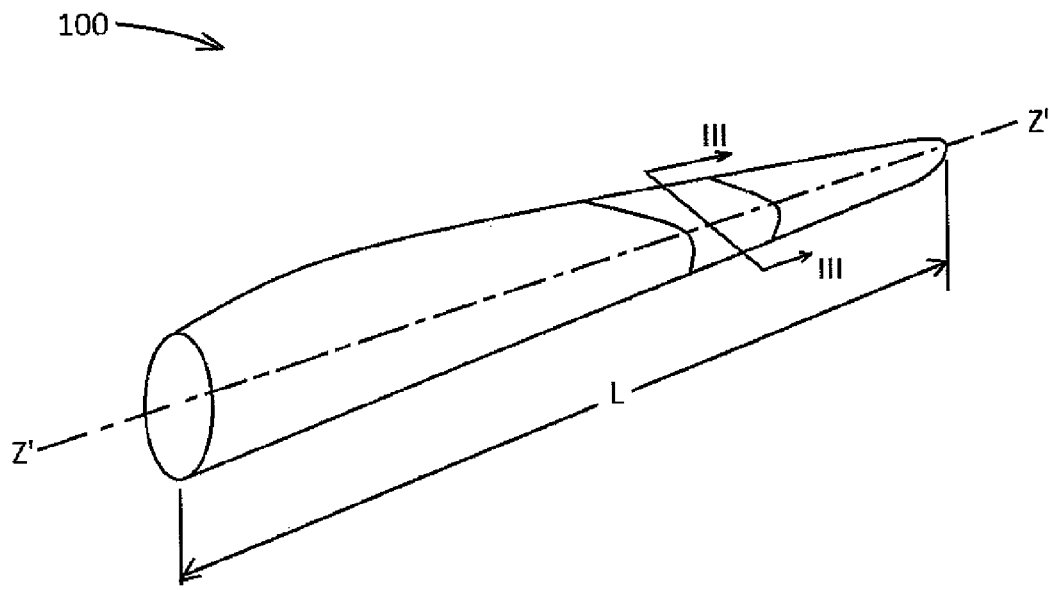
FIG. 2 is a perspective view of a blade in accordance with example embodiments.
Figure 3:
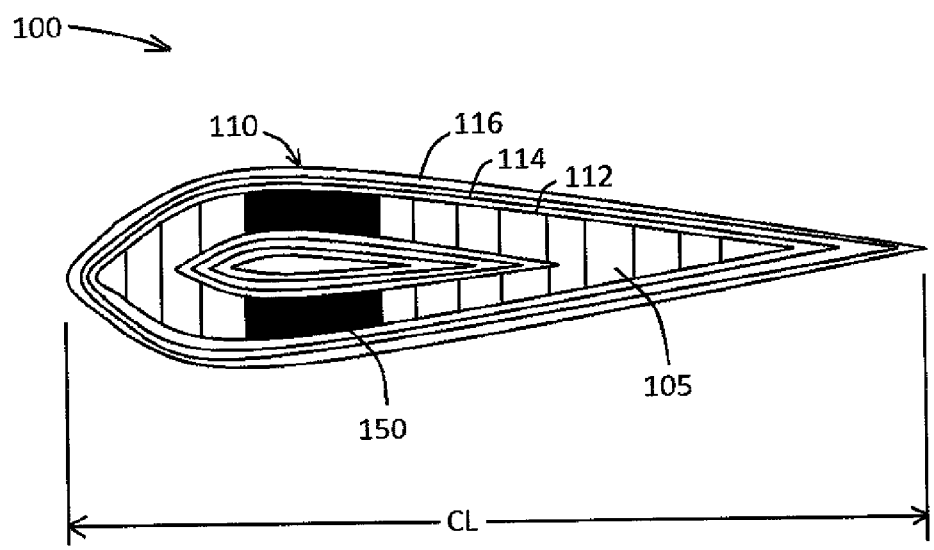
FIG. 3 is a cross section of the blade in accordance with example embodiments.

FIG. 2 is a perspective view of a blade 100 in accordance with example embodiments and FIG. 3 is a cross section of the blade 100 taken through line III-III. As shown in FIG. 2, the example blade 100 includes a pitch axis Z'-Z' which extends along a length L of the blade 100.

In example embodiments, the blade 100 may include a shell 110. The shell 110, for example, may be a laminated fiber-reinforced composite material comprised of a first layer 112, a second layer 114, and a third layer 116. In example embodiments, each of the first layer 112, the second layer 114, and the third layer 116 may include a plurality of fibers. For example, the first layer 112 may include a first plurality of fibers having a first modulus of elasticity, the second layer 114 may include a second plurality of fibers having a second modulus of elasticity, and the third layer 116 may have a third plurality of fibers having a third modulus of elasticity. For example, the first plurality of fibers may include carbon fibers reinforcing a resin matrix and the second and third pluralities of fibers may be E-glass fibers reinforcing resin matrices. In example embodiments, the first modulus of elasticity may be higher than the second modulus of elasticity and the third modulus of elasticity. In example embodiments, the second modulus of elasticity and the third modulus of elasticity may be the same, however, example embodiments are not limited thereto as the second modulus of elasticity may be different from the third modulus of elasticity. The aforementioned materials, however, are not intended to limit example embodiments. For example, in lieu of carbon fibers, the first plurality of fibers may include S glass, high-modulus aromatic polyamide (i.e., aramid), or basalt fibers. As another example, in lieu of using E-glass fibers in the second and third pluralities of fibers, the second and third pluralities of fibers may include other relatively low-modulus glass fibers such as A-glass, C-glass, or H-glass, or low-modulus aramid, or extruded thermoplastic fibers.

In example embodiments, the shell 110 may be formed on a core material 105. The core material 105 may be comprised of a relatively light material. Nonlimiting examples of the core material include end grain balsa, styrene acrylonitrile (SAN) foam, polyvinyl chloride (PVC) foam, and polyethylene terephthalate (PET) foam. In example embodiments, a fiber layer 150 for example, glass or carbon fibers, may be included in the core material. The fiber layer 150 may have fibers which are oriented along a length of the blade 100. In example embodiments, the fiber layer 150 may be shorter than a cord length CL of the blade 100 as shown in FIG. 3 or may have a length substantially the same as the cord length CL of the blade 100. In example embodiments, the fiber layer 150 may run along an entire length L of the blade or may occupy only a portion of the length L. In example embodiments, the fiber layer 150 may be omitted, thus the fiber layer 150 is not intended to be a limiting feature of example embodiments.

Figure 4:
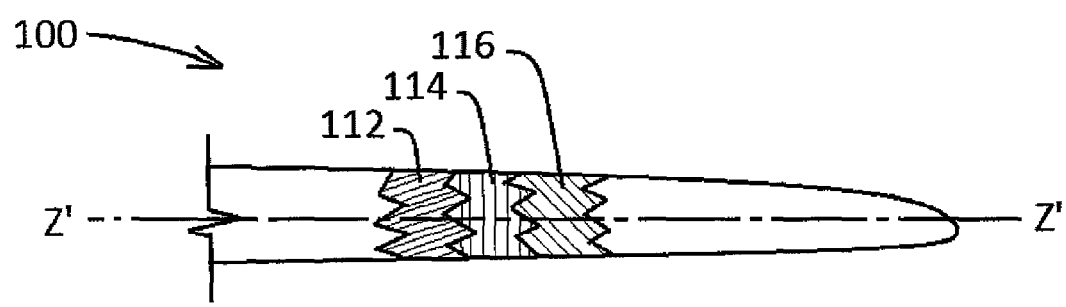
FIG. 4 is a schematic view of a portion of the blade in accordance with example embodiments.
Figure 5A:
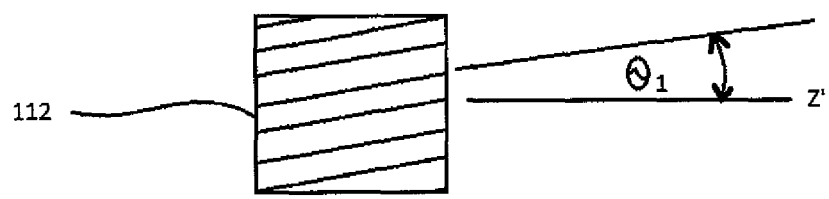
FIGS. 5A-5C are partial views of a first, second, and third layer showing orientations of fibers with respect to a Z-axis which is an axis lying along a length of a blade in accordance with example embodiments.
Figure 5B:
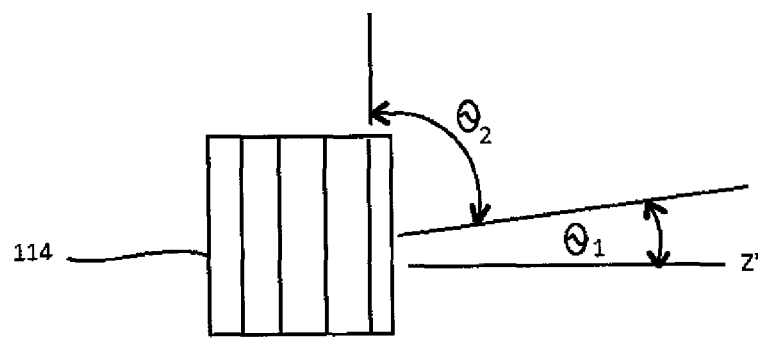
Figure 5C:
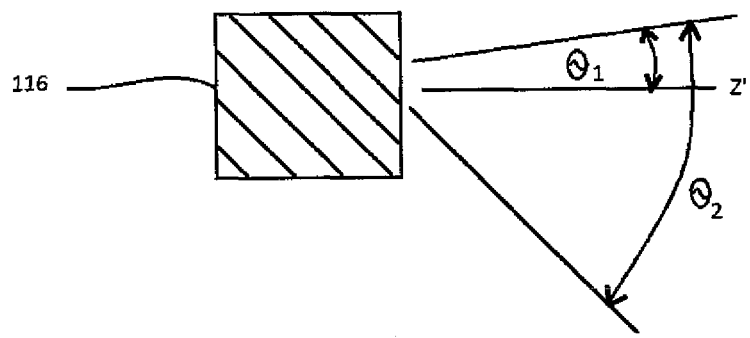

In example embodiments, the first plurality of fibers (which may be substantially parallel fibers) may be oriented at an angle $\theta 1$ degrees relative to the long axis (also referred to as the pitch axis Z'-Z') of the blade 100. In example embodiments, the second plurality of fibers (which may be substantially parallel fibers) may be oriented about $\theta 2$ degrees relative to the first plurality of fibers, and the third plurality of fibers (which may be substantially parallel fibers) may be oriented about $-\theta 2$ degrees relative to the first plurality of fibers. Thus, the first, second, and third pluralities of fibers may form an example of a triaxial fiber-reinforced composite laminate. In example embodiments, $\theta 1$ may be about 10° to about 30° and $\theta 2$ may be about 60° to about 75°. FIG. 4 illustrates the blade having various portions removed to reveal the pluralities of fibers associated with the first layer 112, the second layer 114, and the third layer 116 of the shell 110. FIGS. 5A-5C show a more detailed view of the angles of the fibers associated with the first plurality of fibers in the first layer 112, the second plurality of fibers in the second layer 114, and the third plurality of fibers in the third layer 116 with respect to the long axis Z'-Z' of the blade 100.

Figure 6A:
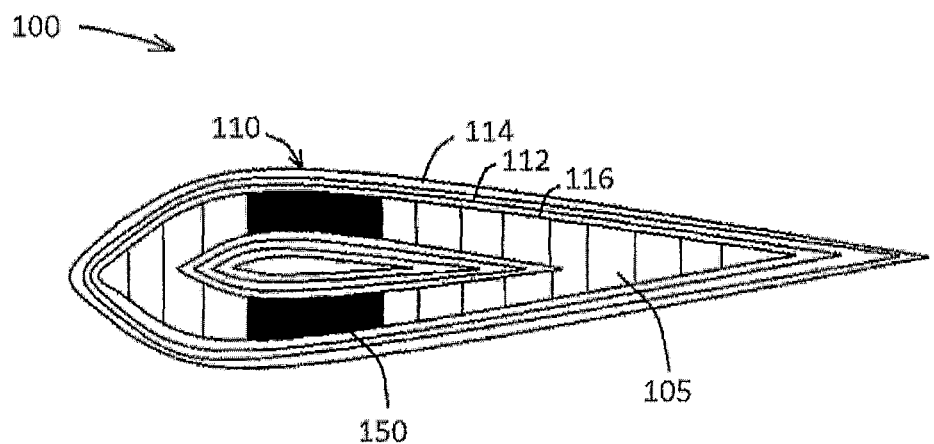
FIGS. 6A and 6B are cross section views of blades in accordance with example embodiments.
Figure 6B:
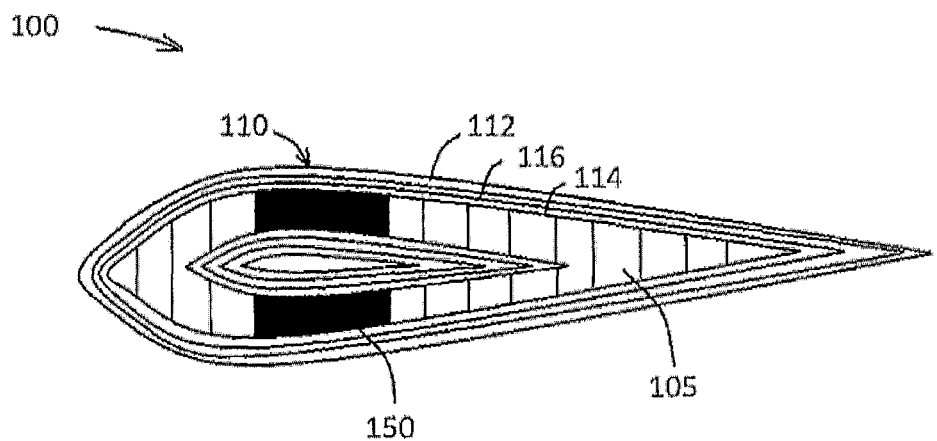

In example embodiments, the second layer 114 may be on the first layer 112 and the third layer 116 may be on the second layer 114 as shown in FIG. 3. The ordering of layers, however, is not intended to limit example embodiments. Thus, example embodiments are not limited to the arrangement illustrated in FIG. 3. For example, in example embodiments, the first layer 112 having the first modulus fibers oriented at angle $\theta 1$ degrees relative to the long axis Z'-Z' may be between the second layer 114 and the third layer 116, wherein of the second layer 114 and the third layer 116 have the second and third modulus fibers and are oriented at $+\theta 2$ degrees relative to the first plurality of fibers and $-\theta 2$ degrees relative to the first plurality of fibers, respectively. Thus, in example embodiments, the first layer 112 may be sandwiched between the second layer 114 and third layer 116 as shown in FIG. 6A. In the alternative, the first layer 112 having the first modulus fibers may be on the third layer 116 such that the third layer 116 is sandwiched between the second layer 114 and the first layer 112 as shown in FIG. 6B. In example embodiments, each of the layers may be directly on one another, however, example embodiments are not limited thereto as intervening layers between each of the first, second, and third layers 112, 114, and 116 may be present. For example, the second layer 114 may be directly on the first layer 112 and the third layer 116 may be directly on the second layer 114 as shown in FIG. 3. In the alternative, the third 116 layer may be directly on the first layer 112 and the second layer 114 may be directly on the third layer 116 as shown in FIG. 6B.

Example embodiments include various orderings of the first layer 112, the second layer 114, and the third layer 116 and the specific examples illustrated in the figures and described above are not intended to limit the invention. For example, if the outer layer of the blade 100 is the third layer 116 (as shown in FIG. 3), the middle layer of the triaxial fiber-reinforced composite laminate of the blade 100 may be one of the first layer 112 and the second layer 114, and the inner layer may be the other of the first layer 112 and the second layer 114. As another example, if the outer layer of the blade 100 is the second layer 114, the middle layer may be one of the first layer 112 and the third layer 116, and the inner layer may be the other of the first layer 112 and the third layer 116. As yet another example, if the outer layer of the blade 100 is the first layer 112, the middle layer may be one of the second layer 114 and the third layer 116, and the inner layer may be the other of the second layer 114 and the third layer 116.

As illustrated above, the triaxial fiber-reinforced composite laminate may be used in the shell (skin) of a blade. In example embodiments, the laminate could be used over an entire extent of the skin, or be confined to distinct regions in a spanwise direction and/or in a chordwise direction. The triaxial fiber-reinforced composite laminate may also be used in flanges (also referred to as "caps") of one or more spars of which the blade may be constructed. The laminate may be used for length of the spar caps or only certain spanwise portions. In addition, the laminate may be combined with traditional unidirectional (0°) fibers of carbon, glass, or other material in the spar caps. Example embodiments are not intended to limit a location or function of the triaxial laminate comprised of the first, second, and third layers 112, 114, and 116. That is, example embodiments are not intended to imply the triaxial laminate is usable only in the skin 110 of a rotor blade as the tri-axial laminate may be arranged in another location of the rotor blade or may be used in a structure different than a rotor blade.

In example embodiments, the triaxial fiber reinforcement may be formed by many methods. For example, the triaxial fiber reinforcement may be formed by laying in a layer of carbon fibers at the off-axis angle θ1, laying in a layer of glass fibers at the appropriate angle θ2 relative to the carbon fibers, and then laying in a layer of glass fibers at a third angle, −θ2 relative to the carbon fibers. Another example of fabricating the triaxial fiber reinforcement may include laying in a layer of carbon fibers at the off-axis angle θ1 and laying in a fabric with glass fibers at the appropriate angles, θ2 and −θ2 (generally referred to as a ±θ2 fabric) with the nominally zero orientation of the fabric parallel to the carbon fibers. As yet another example, the triaxial fiber reinforcement may be fabricated by laying in triaxial fabric with carbon fibers at the off-axis angle θ1 and with glass fibers at the appropriate angles θ2 and −θ2 relative to the carbon fibers, with the nominally zero orientation of the triaxial fabric parallel to a long axis of the blade. As yet another example, the triaxial fiber reinforcement may be fabricated by laying in triaxial fabric with carbon fibers at 0° and with glass fibers at the appropriate angles θ2 and −θ2 relative to the carbon fibers, with the nominally zero orientation of the triaxial fabric parallel aligned at an angle of θ1 relative to the long axis of the blade. In example embodiments, very light weight, nominally nonstructural cross stitching may be used to hold the biaxial or triaxial fabric construction together.

In example embodiments, a blade shell or spar cap structure incorporating the triaxial fiber reinforcement may be manufactured in one large piece, in multiple pieces that are subsequently assembled, in subcomponents that are premolded and incorporated into subsequent structures, or other configurations.

In example embodiments, a core (and even a girder, for example, a carbon or glass fiber girder) of a wind turbine blade may be sandwiched between layers of the triaxial fiber-reinforced composite material. However, example embodiments are not limited thereto as the triaxial fiber-reinforced composite material may simply be applied only to an outside of a wind turbine blade or only to an inside of the wind turbine blade.

In example embodiments, the structures, substructures, or components containing the triaxial fiber reinforcement could be prewetted with liquid resin either mechanically or by hand and laid in or on the mold. The triaxial fiber reinforcement could be laid in or on a blade mold as dry fibers that are subsequently infused or injected with a liquid resin and cured to a solid structure. The triaxial fiber reinforcement could be laid in or on a blade mode as fibers or fabric preimpregnated with resin (so called "prepreg") and subsequently cured with the application of heat and/or pressure.

Figure 7:
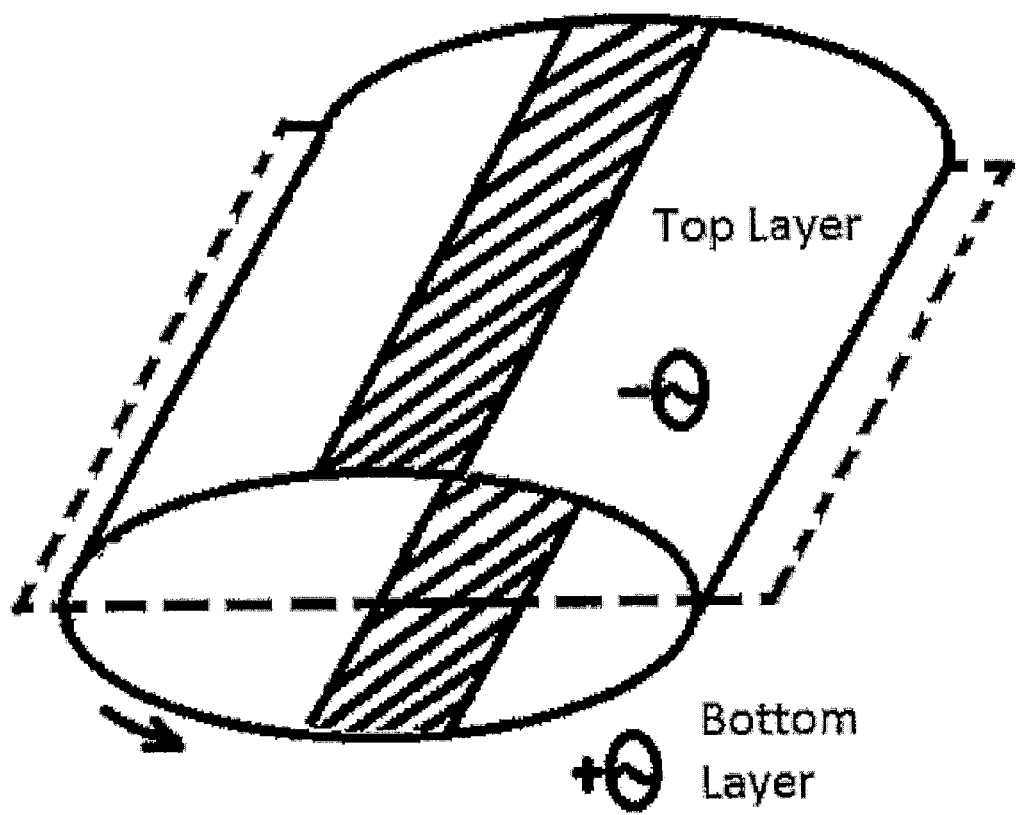
FIG. 7 is a schematic view of a portion of a blade in accordance with example embodiments.

In example embodiments, the fibers may be arranged such that when the blade is viewed in a planform direction, the off axis fibers in opposite shells appear to run more or less in the same direction (see FIG. 7). A blade so constructed will deform torsionally about the Z' axis when the blade bends normal to the Z' axis in response to fluid dynamic loads.

Example embodiments, thus far, are directed to a wind turbine blade. Example embodiments, however, are not limited thereto. For example, any cantilevered structure subject to fluid dynamic loading (for example, tidal turbines, rotorcraft blades, and sail masts) may include the triaxial fiber reinforced composite material.

Table 1 provides some theoretical properties as well as measured properties of a triaxial fiber-reinforced composite laminate in accordance with example embodiments. The theoretical properties were calculated using both classical lamination theory (CLT) and the finite element method (FEM). The particular test specimen had a density of 900 g/m2 and was comprised of 500 g/m2 of carbon fiber in a 0° direction and 400 g/m2 E-glass reinforcement at ±70° with respect to the carbon fibers. As can be seen in Table 1, the measured properties, in some respects, fell in line with the theoretical results. For example, the calculated tensile moduli (parallel to the Carbon fibers and perpendicular to the Carbon fibers) as well as the in-plane shear modulus were substantially the same. However, other properties, such as the actual tensile strengths and the shear strengths were significantly higher than what was expected. Perhaps the most surprising and unexpected result was the more than 3.5 increase in the fatigue resistance which is very fortuitous for structures such as wind turbine blades.

TABLE 1

| Mechanical Property | Estimated Value | Measured Value |
|---|---|---|
| Tensile Modulus, parallel to the carbon fibers | 77 GPa | 75 GPa |
| Tensile Modulus, perpendicular to the carbon | 17 GPa | 16.9 GPa |

TABLE 1-continued

| Mechanical Property | Estimated Value | Measured Value |
|---|---|---|
| fibers | | |
| In-plane shear modulus | 5.1 GPa | 5.1 GPa |
| Tensile Strength, parallel to carbon fibers | 675 MPa | 1100 MPa |
| Compressive Strength, parallel to carbon fibers | 540 MPa | 750 MPa |
| Tensile Strength, Perpendicular to carbon fibers | 200 MPa | 263 MPa |
| In-plane shear strength | 110 MPa | 133 MPa |
| Ratio of in-plane shear strength to modulus | 2.16% | 2.61% |
| Fatigue Resistance at 1 million cycles | 225 MPa | 820 MPa |

Example embodiments of the invention have been described in an illustrative manner. It is to be understood that the terminology that has been used is intended to be in the nature of words of description rather than of limitation. Many modifications and variations of example embodiments are possible in light of the above teachings. Therefore, within the scope of the appended claims, the present invention may be practiced otherwise than as specifically described.

I claim:

1. A wind turbine blade comprised of:
   a skin covering at least a portion of the blade, wherein the skin includes a triaxial fabric consisting essentially of a first layer, a second layer, and a third layer, wherein
   the first layer is comprised of a first plurality of non-woven fibers inclined from a nominally zero orientation of the fabric by about 20 to about 30 degrees, the first plurality of non-woven fibers being comprised of non-woven carbon fibers;
   the second layer is comprised of a second plurality of non-woven fibers inclined from the nominally zero orientation of the fabric by about 85 to about 105 degrees, the second plurality of non-woven fibers being comprised of non-woven glass fibers; and
   the third layer is comprised of a third plurality of non-woven fibers inclined from the nominally zero orientation of the fabric by about −35 to about −55 degrees, the third plurality of non-woven fibers being comprised of non-woven glass fibers, wherein a modulus of elasticity of the non-woven carbon fibers of the first plurality of non-woven fibers is higher than a modulus of elasticity of the non-woven glass fibers of the second plurality of non-woven fibers, the modulus of elasticity of the non-woven glass fibers of the second plurality of non-woven fibers is about the same as a modulus of elasticity of the non-woven glass fibers of the third plurality of non-woven fibers, and wherein the arrangement of the layers is one of the first layer directly attached to the second and third layers, the second layer directly attached to the first and third layers, and the third layer directly attached to the first and second layers, and
   wherein area densities of the second and third pluralities of non-woven fibers are about the same, the area density of the second plurality of non-woven fibers is less than about half of the area density of the first plurality of non-woven fibers, the area density of the third plurality of non-woven fibers is less than about half of the area density of the first plurality of non-woven fibers.

2. The wind turbine blade of claim 1, wherein the ratio of the area density of the plurality of fibers in the first layer to the area density of the plurality of fibers in the second layer is about 5:2.

* * * * *